(12) United States Patent
Fernandez et al.

(10) Patent No.: US 10,790,760 B2
(45) Date of Patent: Sep. 29, 2020

(54) FLEXIBLE RECTIFIER FOR PROVIDING A VARIETY OF ON-DEMAND VOLTAGES

(71) Applicant: Futurewei Technologies, Inc., Plano, TX (US)

(72) Inventors: Pedro Angel Fernandez, Dallas, TX (US); Bing Cai, Plano, TX (US); Yuyu Qiao, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 760 days.

(21) Appl. No.: 15/416,150

(22) Filed: Jan. 26, 2017

(65) Prior Publication Data

US 2017/0133944 A1 May 11, 2017

Related U.S. Application Data

(62) Division of application No. 13/955,123, filed on Jul. 31, 2013, now Pat. No. 9,712,073.

(60) Provisional application No. 61/699,686, filed on Sep. 11, 2012.

(51) Int. Cl.
  *H02M 7/04* (2006.01)
  *H02M 1/42* (2007.01)
  *H02J 1/08* (2006.01)
  *H02M 1/00* (2006.01)

(52) U.S. Cl.
  CPC ............... *H02M 7/04* (2013.01); *H02J 1/08* (2013.01); *H02M 1/4266* (2013.01); *H02M 2001/008* (2013.01); *H02M 2001/0067* (2013.01); *Y10T 307/406* (2015.04)

(58) Field of Classification Search
  CPC ................. H02M 7/04; H02M 1/4266; H02M 2001/0067; H02M 2001/008; H02J 1/08; Y10T 307/406
  See application file for complete search history.

(56) References Cited

U.S. PATENT DOCUMENTS

| 6,140,799 | A | 10/2000 | Thomasson |
| 6,677,847 | B1 | 1/2004 | Ferencz |
| 8,264,805 | B2 | 9/2012 | Norman |
| 2002/0002593 | A1 | 1/2002 | Ewing et al. |
| 2003/0099119 | A1 | 5/2003 | Yamada et al. |
| 2005/0146223 | A1 | 7/2005 | Kanouda et al. |
| 2007/0114852 | A1 | 5/2007 | Lin et al. |

(Continued)

FOREIGN PATENT DOCUMENTS

| CN | 2894063 Y | 4/2007 |
| CN | 101656419 A | 2/2010 |

OTHER PUBLICATIONS

Foreign Communication From a Counterpart Application, PCT Application No. PCT/CN2013/083280, International Search Report dated Dec. 12, 2013, 8 pages.

(Continued)

*Primary Examiner* — Rexford N Barnie
*Assistant Examiner* — Thai H Tran
(74) *Attorney, Agent, or Firm* — Conley Rose, P.C.

(57) ABSTRACT

A dual voltage power system for selectively providing direct current (DC) at two different voltages. The system includes a plurality of universal rectifiers each of which may be configured to operate under a plurality of operating modes using a plurality of switches which may be controlled by a power shelf controller.

19 Claims, 10 Drawing Sheets

(56) References Cited

U.S. PATENT DOCUMENTS

| | | |
|---|---|---|
| 2007/0198865 A1 | 8/2007 | Jan |
| 2007/0219749 A1 | 9/2007 | Jayabalan et al. |
| 2011/0140648 A1 | 6/2011 | Lee et al. |
| 2012/0011376 A1 | 1/2012 | Zai et al. |
| 2012/0043998 A1* | 2/2012 | Hsieh .................... H03K 17/22 |
| | | 327/142 |
| 2012/0044731 A1* | 2/2012 | Wirth ..................... H02M 7/49 |
| | | 363/132 |

OTHER PUBLICATIONS

Foreign Communication From a Counterpart Application, PCT Application No. PCT/CN2013/083280, Written Opinion dated Dec. 12, 2013, 5 pages.

Office Action dated Mar. 2, 2016, 7 pages, U.S. Appl. No. 13/955,123, filed Jul. 31, 2013.

Office Action dated Aug. 25, 2016, 23 pages, U.S. Appl. No. 13/955,123, filed Jul. 31, 2013.

\* cited by examiner

FLEXIBLE RECTIFIER FOR PROVIDING A VARIETY OF ON-DEMAND VOLTAGES

CROSS-REFERENCE TO RELATED APPLICATIONS

The present application is a divisional of U.S. patent application Ser. No. 13/955,123 filed Jul. 31, 2013 by Pedro Angel Fernandez et al., and entitled "Flexible Rectifier for Providing a Variety of On-demand Voltages," which claims benefit of U.S. Provisional Patent Application No. 61/699,686 filed Sep. 11, 2012 by Pedro Angel Fernandez, et al. and entitled "Flexible AC Rectifier System To Provide On-Demand 24 VDC and 48 VDC," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The telecommunication industry has drastically improved over the last century by employing variety of technologies. In regards to the power required to run active telecommunication devices, direct current (DC) voltages are typically used as the power source. Supplying DC voltages is the easiest way to provide battery support in instances of an alternating current (AC) power failure. To provide DC voltages, two standards currently used are +24 voltage DC (VDC) and −48 VDC, both of which are referred to nominally. Supplying the two voltages are problematic because the two voltages are not only different in magnitude, but also in polarity. Conventional systems for supplying the two voltages may use dual power systems that duplicate components, and thereby increases costs. Additionally, conventional power systems may require users to plan ahead regarding which rectifier base voltage they will use, and to purchase either a −48 VDC or +24 VDC system. The power systems will use secondary converters for the second voltage. As a result, a wrong prediction requires the full system to be replaced. Additionally, current systems require one of the two voltages to be created by a second conversion step, thus reducing the overall efficiency. Thus, a solution is desirable that produces these two output voltages at their proper polarities and allow for selection of either voltage using one power system.

SUMMARY

In one embodiment, the disclosure includes an apparatus comprising a first rectifier, wherein an output of the first rectifier is coupled to a first terminal, a second rectifier, wherein an output of the second rectifier is coupled to a second terminal, a first electronic switch coupled to an input of the first rectifier and an input of the second rectifier, wherein the first electronic switch is configured to selectively route an alternating current (AC) signal to the first rectifier or the second rectifier, an inverter configured to operate in the event that the first electronic switch does not receive the AC signal to receive a direct current (DC) signal, and convert the DC signal to a second AC signal, a second electronic switch coupled to the first terminal, the second terminal, and an input of the inverter, wherein the second electronic switch is configured to selectively route the DC signal from the first terminal or the second terminal to the inverter, and a third electronic switch coupled to the input of the first rectifier, the input of the second rectifier, and an output of the inverter, wherein the third electronic switch is configured to selectively route the second AC signal to the first rectifier or the second rectifier.

In another embodiment, the disclosure includes an apparatus comprising a first bus trace, a second bus trace, a third bus trace, and a switch configured to selectively provide a first direct current (DC) voltage between the first bus trace and the third bus trace and a second DC voltage between the second bus trace and the third bus trace.

In yet another embodiment, the disclosure includes an electrical load current balancing method comprising communicating electrical power to an electrical load via a power shelf, wherein the power shelf comprises a plurality of universal rectifiers, detecting an electrical load current imbalance, and communicating one or more control signals to a universal rectifiers and thereby balance the electrical load current.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of a power transmission apparatus, system, and methods of using the same. Particularly disclosed herein are one or more embodiments of a dual voltage power system (DVPS) and method of using the same. In one or more of the embodiments as will be disclosed herein, the DVPS may be generally configured to transmit the power to one or more electrical loads (e.g., a +24 VDC electrical load and/or a −48 VDC electrical load) from one or more types of power sources (e.g., an alternating current (AC) source, a +24 VDC source, and/or a −48 VDC source).

Figure 1:
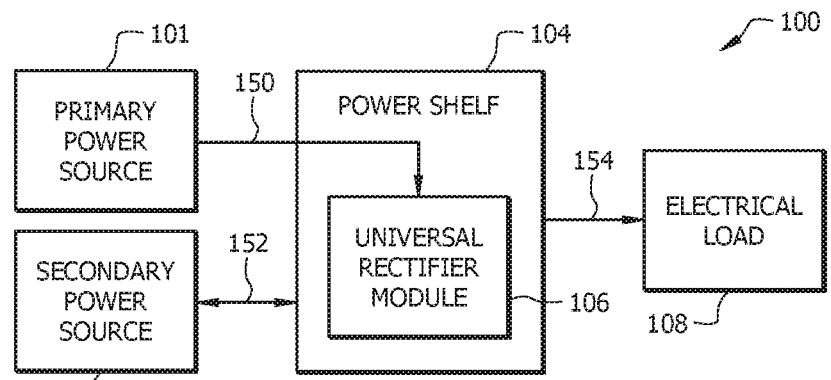
FIG. 1 is a schematic view of an embodiment of a dual voltage power system.

Referring to FIG. 1, an embodiment of a DVPS 100 is illustrated. In such an embodiment, the DVPS 100 generally comprises a primary power source 101, a secondary power source 102, a power shelf 104, one or more universal rectifiers 106, and an electrical load 108. A single electrical load 108 is shown for illustrative purposes but there may be more than one electrical load as described herein. For example, the power shelf 104 may be electrically coupled to the primary power source 101 (e.g., via electrical connection 150), to the secondary power source 102 (e.g., via electrical connection 152) and to the electrical load 108 (e.g., via electrical connection 154). Additionally, the one or more universal rectifiers 106 may be installed onto and/or integrated with the power shelf 104, for example, via a universal rectifier interface 116, as will be disclosed herein.

In an embodiment, the primary power source 101 and the secondary power source 102 are generally configured to provide electrical power to one or more electrical loads 108, for example, via the power shelf 104 and the universal rectifiers 106, as will be disclosed herein. In an embodiment, the primary power source 101 is an AC power source, for example, an AC power source configured to provide a ±120 volt alternating current (VAC) voltage signal. For example, the primary power source 101 may be supplied by conventional methods, such as, via an electrical connection to a power utility grid. Alternatively, the primary power source 101 may have any suitable AC voltage signal, for example, within the range of about ±90 VAC to about ±240 VAC, as would be appreciated by one of ordinary skill in the art upon viewing this disclosure.

Figure 2:
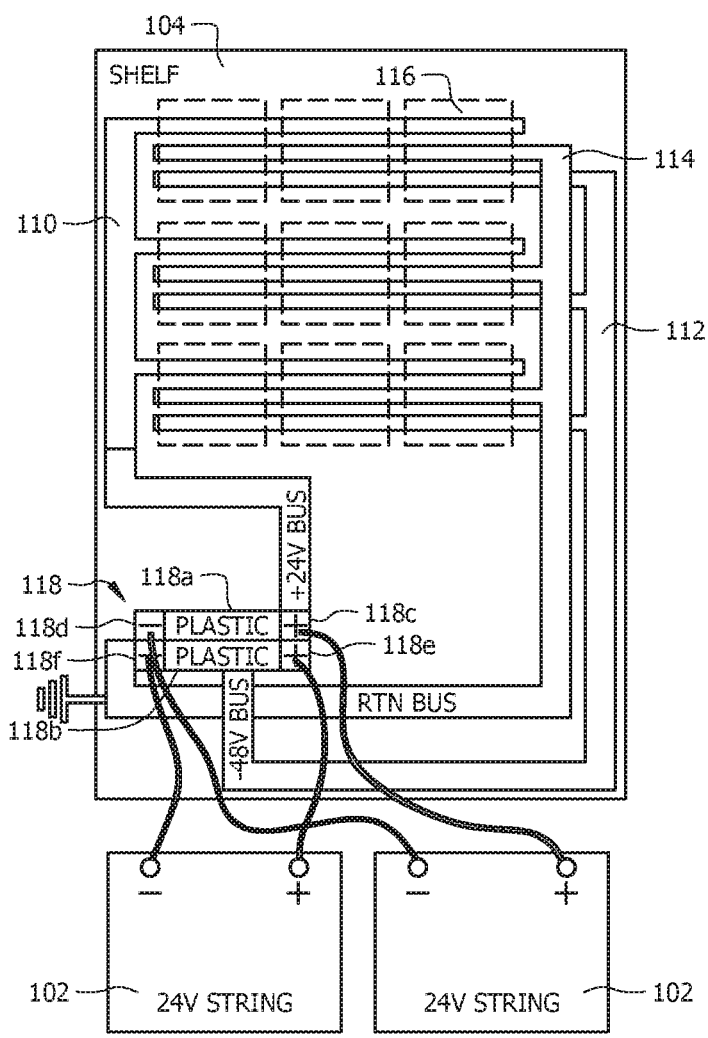
FIG. 2 is a schematic view of a configuration of an embodiment of a power shelf configuration.
Figure 3:
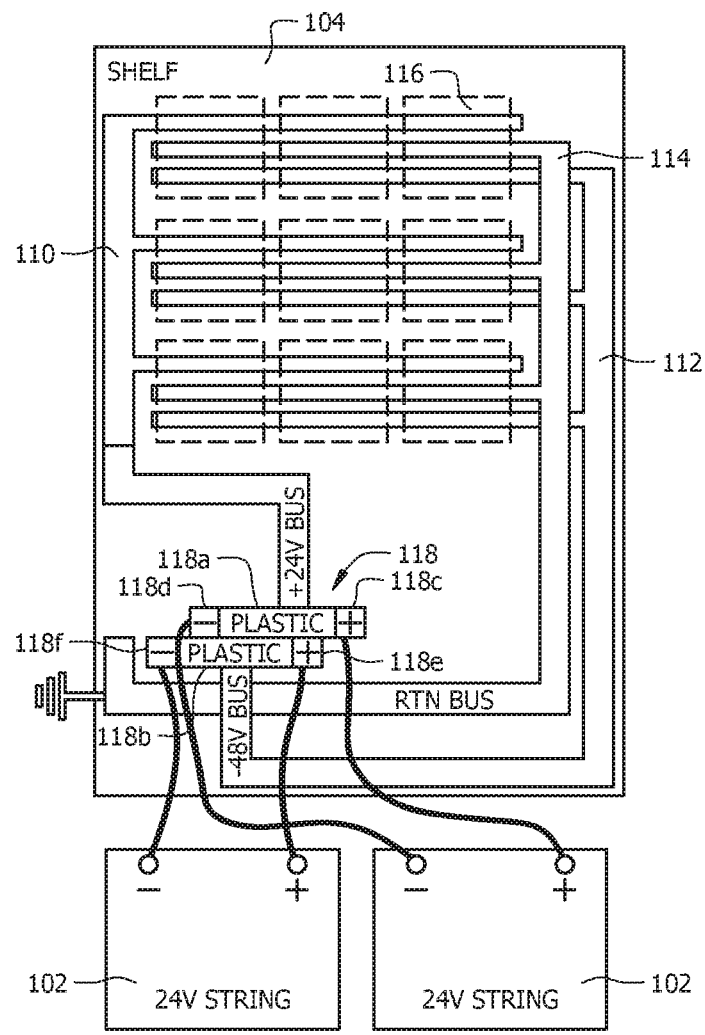
FIG. 3 is a schematic view of another configuration of an embodiment of a power shelf configuration.
Figure 4:
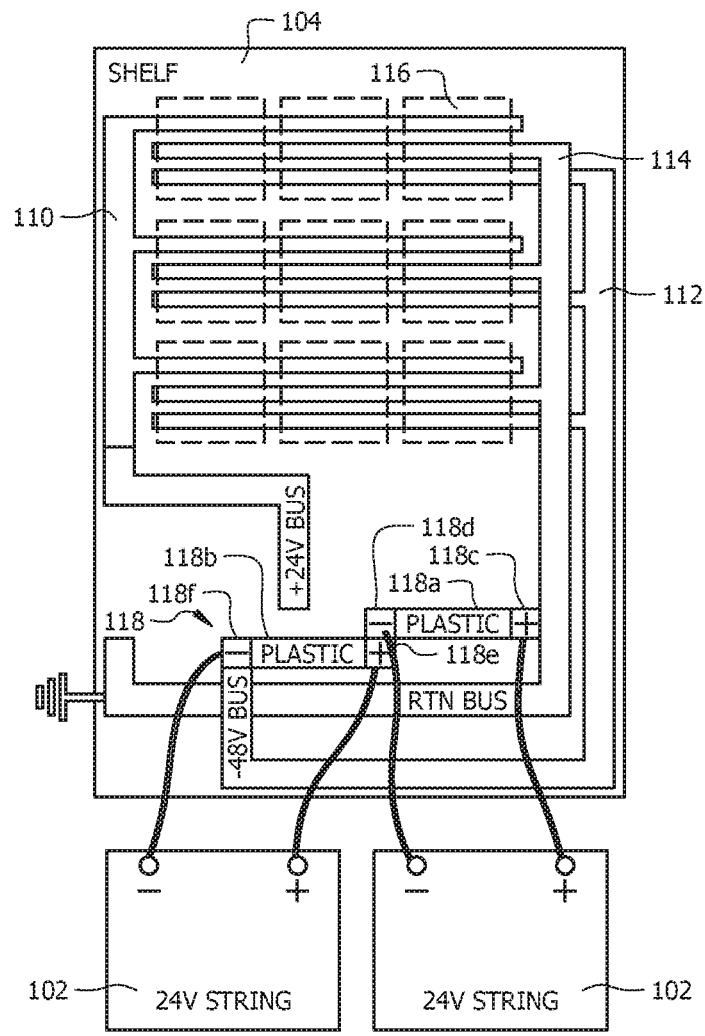
FIG. 4 is a schematic view of another configuration of an embodiment of a power shelf configuration.

In an embodiment, the secondary power source 102 may be configured to provide electrical power to the electrical load 108 in the event of a power loss of the primary power source 101 (e.g., the primary power source 101 becomes unavailable). For example, the secondary power source 102 may be a DC voltage source. Furthermore, the secondary power source 102 may comprise one or more battery strings (e.g., one or more +24 VDC battery strings, one or more +48 VDC battery string). Referring to FIGS. 2-4, the secondary power source 102 is a plurality of +24 VDC battery strings (thus, in some contexts the secondary power source 102 may be referred to as secondary power sources 102). In an alternative embodiment, the secondary power source 102 is a −48 VDC battery string. Alternatively, the secondary power source 102 is any other suitable DC voltage source as would be appreciated by one of ordinary skill in the art upon viewing this disclosure. Additionally, the secondary power source 102 may be further configured to receive power from the primary power source 101, for example, to charge or recharge the secondary power source 102, as will be disclosed herein.

Referring to FIGS. 2-4, several configurations of an embodiment of the power shelf 104 are illustrated. The power shelf 104 may be configurable to provide for a plurality of power operation modes, as will be disclosed herein. In an embodiment, the power shelf 104 comprises a shelf selector or switch 118, a plurality of universal rectifier interfaces 116, and a plurality of bus traces and/or contacts (a "bus trace" is sometimes referred to as a "trace" for short), for example, a +24 VDC trace 110, a return (RTN) trace 114, and a −48 VDC trace 112.

Each of the bus traces and/or contacts (e.g., the +24 VDC trace 110, the return (RTN) trace 114, and the −48 VDC trace 112) may be configured to provide independent routes of electrical current communication between a plurality of components coupled and/or integrated with the power shelf 104, as will be disclosed herein. For example, the bus traces may independently provide a +24 VDC current flow path, a −48 VDC current flow path, and a RTN current flow path. Additionally, the bus traces may provide a route of electrical current communication between one or more power sources (e.g., the primary power source 101, the secondary power source 102, etc.) and one or more electrical loads 108, as will be disclosed herein.

In an embodiment, the switch 118 configures the power shelf 104 to selectively allow and/or disallow one or more routes of electrical current flow, for example, between the secondary power supply 102 and the electrical loads 108 via one or more of the bus traces, as will be disclosed herein. In the embodiment of FIGS. 2-4, the switch 118 comprises a first switch portion 118a and a second switch portion 118b each having a first contact (e.g., a positive voltage terminal) and a second contact (e.g., a negative voltage terminal), for example, the first switch portion 118a may comprise a first contact 118c and a second contact 118d and the second switch portion 118b may comprise a first contact 118e and a second contact 118f. The switch 118 is also configurable and selectable between a first configuration and a second configuration and between the second configuration and a third configuration, as will be disclosed herein.

In an embodiment, the first contact and the second contact are configured to electrically couple the secondary power source 102 (e.g., a battery string) to the power shelf 104. For example, referring to FIGS. 2-4, the first contact may be electrically coupled to a positive voltage terminal of a +24 VDC battery string and the second contact may be electrically coupled to a negative voltage terminal of the +24 VDC battery string. Further, the first contact and the second contact (e.g., the first switch portion 118a and the second switch portion 118b) may not be electrically coupled with each other, for example, the first contact and the second contact may be separated by a dielectric material (e.g., a plastic).

In an embodiment, the power shelf 104 may be adjustable between a first configuration and a second configuration and between the second configuration and a third configuration. Referring to FIG. 2, an embodiment of the power shelf 104 and the switch 118 are each illustrated in the first configuration. In such an embodiment, the first switch portion 118a may be configured such that the first contact 118c is electrically coupled to the +24 VDC trace 110 and the second contact 118d is electrically coupled to the RTN trace 114. Additionally, the second switch portion 118b may be configured such that the first contact 118e is electrically coupled to the +24 VDC trace 110 and/or the first contact 118c of the first switch portion 118*a* and the second contact 118*f* is electrically coupled to the RTN trace 114 and/or the second contact 118*d* of the first switch portion 118*a*. As such, when the power shelf 104 is in the first configuration, the power shelf 104 may be configured for +24 VDC power operation. Additionally, the first switch portion 118*a* and the second switch portion 118*b* may each be electrically coupled to a secondary power source 102 (e.g., a +24 VDC power source) and may electrically couple the secondary power sources 102 in parallel and, thereby provide a +24 VDC power source to the power shelf 104. Not intending to be bound by theory, the parallel connection of the two secondary power sources 102 (e.g., the battery strings) may increase (e.g., double) the amount of electrical current that can be provided by the secondary power sources 102.

Referring to FIG. 3, an embodiment of the power shelf 104 and the switch 118 are each illustrated in the second configuration. In such an embodiment, the power shelf 104 may be configured to decouple the secondary power source 102 (e.g., one or more battery strings) from the bus traces, for example, to disable power operation and/or to prevent short circuits. For example, the first switch portion 118*a* may be configured such that the first switch portion 118*a* is not electrically coupled to the bus traces (e.g., the +24 VDC trace 110, the RTN trace 114, the −48 VDC trace 112) or the second switch portion 118*b* (e.g., the first contact 118*e* and the second contact 118*f*). Additionally, the second switch portion 118*b* may be configured such that the second switch portion 118*b* is not electrically coupled to the bus traces (e.g., the +24 VDC trace 110, the RTN trace 114, the −48 VDC trace 112) or the first switch portion 118*b* (e.g., the first contact 118*c* and the second contact 118*d*). For example, the first switch portion 118*a* and the second switch portion 118*b* may each be electrically coupled to a secondary power source 102 (e.g., a +24 VDC power source) and may not electrically couple the secondary power source 102 to the power shelf 104.

Referring to FIG. 4, an embodiment of the power shelf 104 and the switch 118 are each illustrated in the third configuration. For example, the first switch portion 118*a* may be configured such that the first contact 118*c* is electrically coupled to the RTN trace 114 and the second contact 118*d* is electrically coupled to the first contact 118*e* of the second switch portion 118*b*. Additionally, the second switch portion 118*b* may be configured such that the first contact 118*e* is electrically coupled to the second contact 118*d* of the first switch portion 118*a* and the second contact 118*f* is electrically coupled to the −48 VDC trace 112. In an embodiment, when the power shelf 104 is in the third configuration, the power shelf 104 may be configured for −48 VDC power operation. For example, the first switch portion 118*a* and the second switch portion 118*b* may each be electrically coupled to a secondary power source 102 (e.g., a +24 VDC battery string) and may electrically couple the secondary power sources 102 in series and, thereby provide a −48 VDC power source to the power shelf 104.

In an alternative embodiment, the power shelf 104 may be configured for −48 VDC power operation via a direct connection of a +48 VDC battery string to the power shelf 104. For example, the negative terminal of the +48 VDC battery string may be electrically coupled to the −48 VDC trace 112 and the positive terminal of the +48 VDC battery string may be electrically coupled to the RTN trace 114 of the power shelf 104.

In an embodiment, the universal rectifier interface 116 may be configured to electrically couple the bus traces (e.g., the +24 VDC trace 110, the RTN trace 114, the −48 VDC trace 112) to one or more universal rectifiers 106 and, thereby provide a route of electrical current flow between the power shelf 104 and the one or more universal rectifiers 106. Additionally, the universal rectifier interface 116 may be configured to secure one or more universal rectifiers 106 to the power shelf 104, for example, via one or more suitable fastening mechanisms (e.g., clips, bolts, welded bonds, solder joints, etc.). Any suitable fastening mechanism may be employed as would be appreciated by one of ordinary skill in the art upon viewing this disclosure. Further, the power shelf 104 may be configured to receive 1, 2, 3, 5, 6, 7, 8, 9, 10, 11, 12, 24, 36, or any suitable number of universal rectifiers 106 as would be appreciated by one of ordinary skill in the art upon viewing this disclosure and, as such, may comprise a corresponding number of universal rectifier interfaces 116.

Referring to FIGS. 5-8, schematic diagrams of an embodiment of a universal rectifier 106 are presented. The universal rectifier 106 may be configured to convert a power source (e.g., the primary power source 101 and/or the secondary power source 102) from a first power source type to a second power source type. For example, the universal rectifier 106 may be configured to convert an AC voltage signal to a DC voltage signal (e.g., a +24 VDC voltage signal, a −48 VDC voltage signal, etc.). Alternatively, the universal rectifier 106 may be configured to convert a DC voltage signal from a first voltage to a second voltage, for example, +24 VDC voltage signal to −48 VDC voltage signal or −48 VDC voltage signal to +24 VDC voltage signal. In an embodiment, the universal rectifier 106 may be configured for a +24 VDC power operation mode such that the universal rectifier 106 is configured to provide power to a +24 VDC electrical load from a plurality of power sources (e.g., the primary power source 101 and the secondary power source 102). Alternatively, the universal rectifier 106 may be configured for a −48 VDC power operation mode such that the universal rectifier 106 is configured to provide power to a −48 VDC electrical load from a plurality of power sources (e.g., the primary power source 101 and the secondary power source 102).

In an embodiment, the universal rectifier 106 may generally comprise a plurality of electronic switches (e.g., transistors, relays, diodes, etc.) and a plurality of interconnected electronic circuits (e.g., a power factor correction (PFC) circuit, an inductor-inductor-capacitor (LLC) converter, an DC converter, etc.), as will be disclosed herein. For example, referring to FIGS. 5-8, the universal rectifier 106 may be configured such that a PFC circuit, as understood by a person of ordinary skill in the art such as PFC circuit 300, for example, convert an AC signal to a rectified AC signal (e.g., a half-wave rectified signal or a full-wave rectified signal). Additionally, the output of the PFC circuit 300 may be connected to a capacitor (e.g., a smoothing capacitor) which may convert the rectified AC signal to a first DC voltage signal (e.g., a 300 VDC signal). In such an embodiment, the PFC circuit 300 is configured to receive an input voltage from the primary power source 101 (e.g., via electrical connection 350) and to output an electrical signal to a first electronic switch 302 (e.g., via electrical connection 352). The first electronic switch 302 may be configured to be electronically actuatable (e.g., via an electronic control signal) and selectively provide a route of electrical current communication to a first DC converter 304 (e.g., via electrical connection 354) and/or to a second DC converter 306 (e.g., via electrical connection 358). The first DC converter 304 may be configured to convert the first DC voltage signal to a second DC voltage signal. In such an embodiment, the first DC converter 304 is configured to receive an electrical signal (e.g., the first DC voltage signal) from the first electronic switch 302 and to output a second DC voltage signal to a terminal 366 (e.g., via electrical connection 356). For example, the first DC converter 304 may be a LLC resonant converter configured to receive a first DC voltage signal and to output a +24 VDC voltage signal to the +24 VDC trace 110 via the terminal 366. The second DC converter 306 may be configured to convert a first DC voltage signal to a third DC voltage signal, similar to previously disclosed with respect to the first DC converter 304. In such an embodiment, the second DC converter 306 is configured to receive a first DC voltage signal from the first electronic switch 302 and to output a third DC voltage signal to a terminal 370 (e.g., via electrical connection 360). For example, the second DC converter 306 may be a LLC resonant converter configured to receive a first DC voltage signal and to output a −48 VDC voltage signal to the −48 VDC trace 112 via the terminal 370. Additionally, the universal rectifier 106 may configured such that a second electronic switch 312 is configured to receive a DC voltage signal (e.g., the second DC voltage signal or the third DC voltage signal) from either the first DC converter 304 (e.g., via electrical connection 356) or the second DC converter 306 (e.g., via electrical connection 360), respectively. As such, the second electronic switch 312 may be configured to be electronically actuatable (e.g., via an electronic control signal) to enable a route of electrical current communication from the first DC converter 304 and/or the second DC converter 306 to a third DC converter 310. The third DC converter 310 may be configured to receive an electrical signal (e.g., a DC voltage signal between about +20 VDC and about +58 VDC) from the second electronic switch 312 and to output a fourth DC voltage signal. For example, the third DC converter 310 may be configured to receive a +24 VDC voltage signal or a −48 VDC voltage signal and to output a fourth DC voltage signal. Further, the universal rectifier 106 may configured such that a third electronic switch 308 configured to be electronically actuatable (e.g., via an electronic control signal) and selectively provide a route of electrical current communication to the first DC converter 304 (e.g., via electrical connection 354) and/or to the second DC converter 306 (e.g., via electrical connection 358). For example, the third electronic switch 308 may be configured to receive the fourth DC voltage signal from the third DC converter 310 and to output the fourth DC voltage signal to the first DC converter 304 or the second DC converter 306. Additionally, the universal rectifier 106 may comprise a common electrical ground for the plurality of electronic circuits and may be configured to electrically couple the common electrical ground via a terminal 368, for example, to the RTN bus 114 of the power shelf 104.

Figure 5:
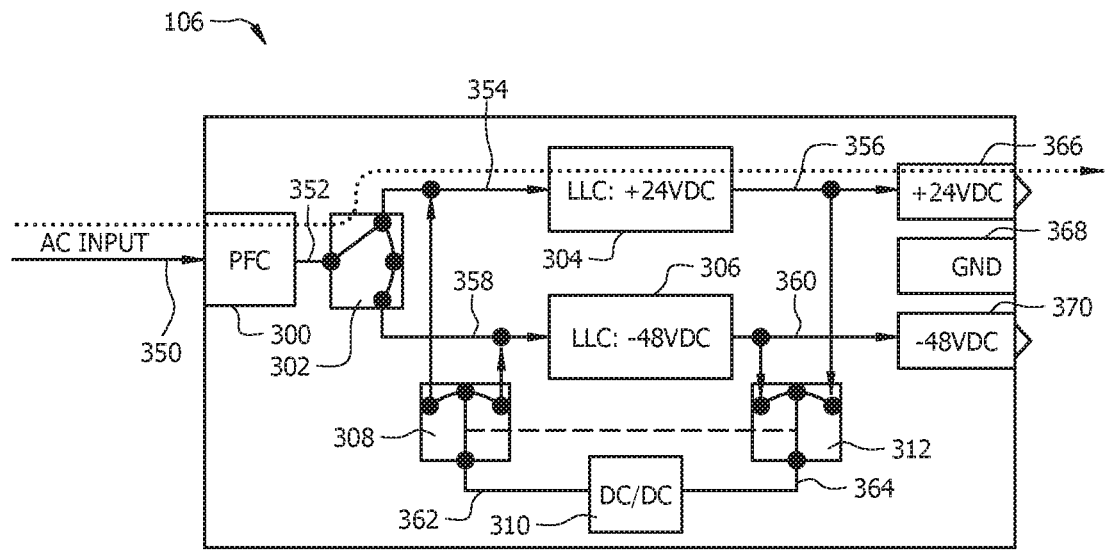
FIG. 5 is a schematic view of a configuration of an embodiment of a universal rectifier operational configuration.

In an embodiment as shown in FIG. 5, the universal rectifier 106 is configured in a +24 VDC power operation mode and is configured to provide power to a +24 VDC electrical load via the primary power source 101 (e.g., an AC power source). For example, the universal rectifier 106 is configured such that an AC voltage signal flows from the primary power source 101 to the terminal 366 via the PFC 300, the first electronic switch 302, and the first DC converter 304, respectively.

Figure 6:
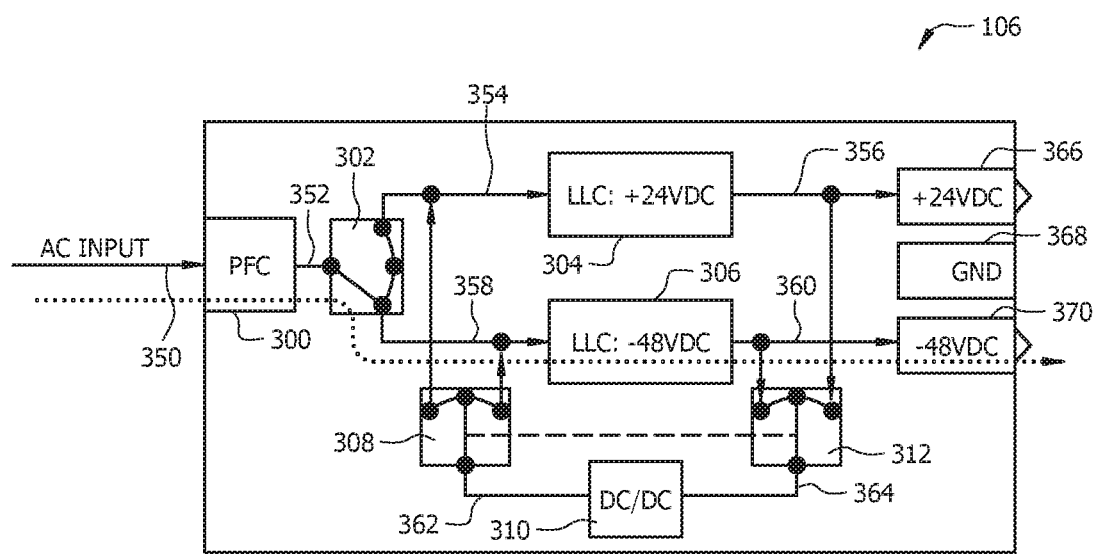
FIG. 6 is a schematic view of another configuration of an embodiment of a universal rectifier operational configuration.

In an embodiment as shown in FIG. 6, the universal rectifier 106 is configured in a −48 VDC power operation mode and is configured to provide power to a −48 VDC electrical load via the primary power source 101 (e.g., an AC power source). For example, the universal rectifier 106 is configured such that an AC voltage signal flows from the primary power source 101 to the terminal 370 via the PFC 300, the first electronic switch 302, and the second DC converter 306, respectively.

Figure 7:
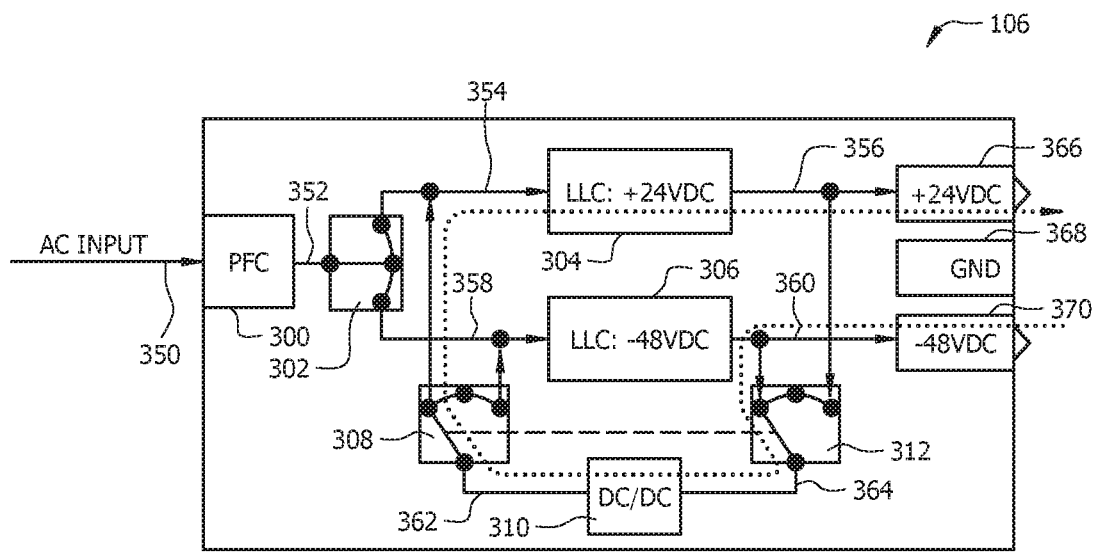
FIG. 7 is a schematic view of another configuration of an embodiment of a universal rectifier operational configuration.

In an embodiment as shown in FIG. 7, the universal rectifier 106 is configured in a +24 VDC power operation mode and is configured to provide power to a +24 VDC electrical load via the secondary power source 102 (e.g., a battery string), for example, in the event of a loss of power from the primary power source 101. For example, the universal rectifier 106 is configured such that a DC voltage signal flows from the secondary power source 102 (e.g., a −48 VDC battery string) to the terminal 366 via the terminal 370 (i.e., a secondary power source is connected to the terminal 370), the second electronic switch 312, the third DC converter 310, the third electronic switch 308, and the first DC converter 304, respectively. In such an embodiment, the universal rectifier 106 is configured to convert the −48 VDC voltage signal to a +24 VDC voltage signal to be supplied to the electrical load 108.

Figure 8:
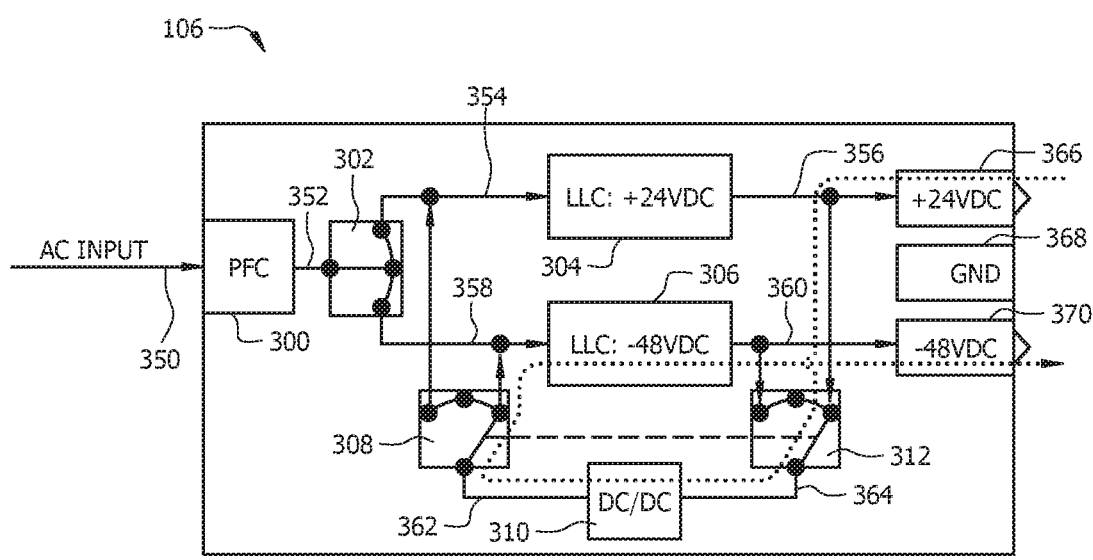
FIG. 8 is a schematic view of another configuration of an embodiment of a universal rectifier operational configuration.

In an embodiment as shown in FIG. 8, the universal rectifier 106 is configured in a −48 VDC power operation mode and is configured to provide power to a −48 VDC electrical load via the secondary power source 102 (e.g., a battery string), for example, in the event of a loss of power from the primary power source 101. For example, the universal rectifier 106 is configured such that a DC voltage signal flows from the secondary power source 102 (e.g., a +24 VDC battery string) to the terminal 370 via the terminal 366 (i.e., a secondary power source is connected to the terminal 366), the second electronic switch 312, the third DC converter 310, the third electronic switch 308, and the second DC converter 306, respectively. In such an embodiment, the universal rectifier 106 is configured to convert the +24 VDC voltage signal to a −48 VDC voltage signal to be supplied to the electrical load 108.

Additionally, one or more portions of the universal rectifier 106 may be electronically switchable, for example, via software and/or a control signal. For example, the first electronic switch 302, the second electronic switch 312, and/or the third electronic switch 308 may each be electronically actuatable via a shelf controller, for example, to selectively provide a route of electrical signal communication, as will be disclosed herein. Alternatively, the first electronic switch 302, the second electronic switch 312, and/or the third electronic switch 308 may each be mechanically actuatable, for example, via a mechanical switch. In such embodiments, the universal rectifier 106 may be transitional between the +24 VDC power operation mode and the −48 VDC power operation mode. Additionally, the universal rectifier 106 may be transitional between an "off state" (e.g., a state where no mode of power operation is provided) and the +24 VDC power operation mode or the −48 VDC power operation mode.

In an alternative embodiment, the second electronic switch 312 and/or the third electronic switch 308 may be a diode, for example, for the purpose of improving the switching response time. In such an embodiment, the one or more diodes may be configured to forward bias and to communicate electrical current upon a loss of power from the primary power source 101.

In the embodiments, as previously disclosed, the universal rectifier 106 is configured to provide the ability to provide electrical power to a plurality of electrical load types 108 (e.g., a +24 VDC electrical load and a −48 VDC electrical load) from a plurality of power source types (e.g., an AC voltage source, a +24 VDC voltage source, a −48 VDC voltage source) with a single conversion stage. For example, the universal rectifier 106 is configured to convert the primary power source 101 from an AC voltage signal to both a +24 VDC voltage signal and a −48 VDC voltage signal with a single rectifier or AC/DC conversion stage, for example, via the PFC circuit 300 and the first DC converter 304 or the PFC circuit 300 and the second DC converter 306. Additionally, such a single stage AC/DC conversion may provide high efficiency and reduce the amount of power lost when compared to performing a multiple stage AC/DC conversion, for example, having additional DC/DC conversions stages. Further, the universal rectifier 106 is configured to convert the secondary power source 102 (e.g., a +24 VDC battery string or a −48 VDC battery string) to provide electrical power to a +24 VDC electrical load or a −48 VDC electrical load with a first DC/DC conversion stage via the third DC converter 310 and a second DC/DC conversion stage via the first DC converter 304 or the second DC converter 306. As such, the universal rectifier 106 allows bidirectional electrical current flow to/from the secondary power sources 102.

Referring again to FIG. 1, the electrical load (e.g., the electrical load 108) may be a resistive load, a capacitive load, and/or an inductive load. As such, the electrical load 108 may be configured to receive power from a power source (e.g., the primary power source 101 and/or the secondary power source 102) via the power shelf 104. In an embodiment, the electrical load 108 may comprise a +24 VDC electrical load or a −48 VDC electrical load. In an alternative embodiment, the electrical load 108 may comprise any other suitable electrical load as would be appreciated by one of ordinary skill in the arts upon viewing this disclosure, or combinations thereof.

Figure 9:
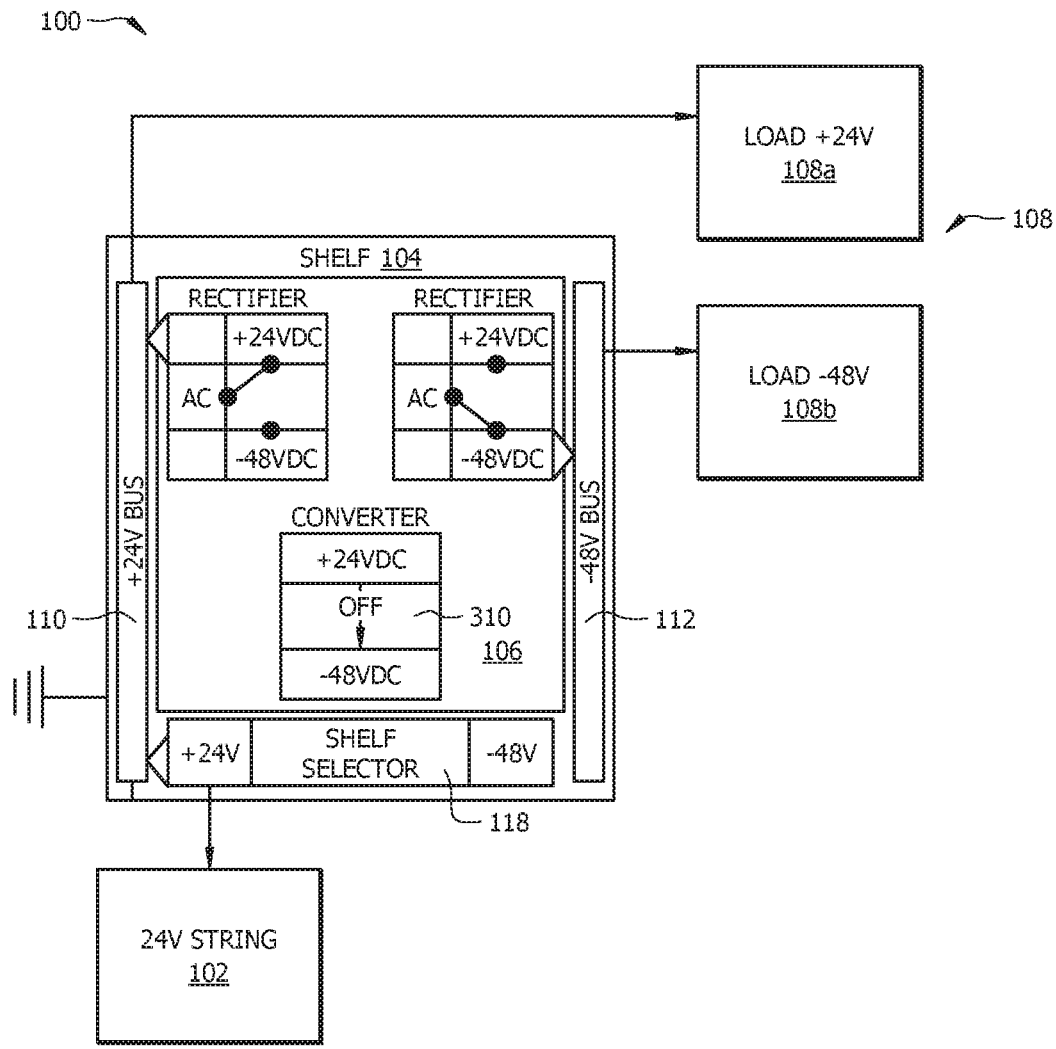
FIG. 9 is a schematic view of an embodiment of a dual voltage power system.

Referring to FIG. 9, an embodiment of a DVPS 100 is illustrated. In such an embodiment, the DVPS 100 is electrically coupled to and receives power from the primary power source 101 (not shown) via the universal rectifier 106. The secondary power source 102 is a +24 VDC battery string and is electrically coupled to the power shelf 104 (e.g., via the switch 118). Additionally, the power shelf 104 is configured such that the switch 118 is configured in first configuration and thereby configured for +24 VDC power operation. The electrical load 108 comprises a +24 VDC electrical load 108a electrically coupled to the +24 VDC trace 110 of the power shelf 104 and a −48 VDC electrical load 108b electrically coupled to the −48 VDC trace 112 of the power shelf 104. In the embodiment of FIG. 9, the DVPS 100 is configured to provide electrical power to the electrical loads 108 (e.g., the +24 VDC electrical load and the −48 VDC electrical load) via the universal rectifier 106. Additionally, while power is available from the primary power source 101 (not shown) is present, the universal rectifier 106 is configured to provide electrical power to the secondary power source 102, for example to charge or recharge the secondary power source 102.

Figure 10:
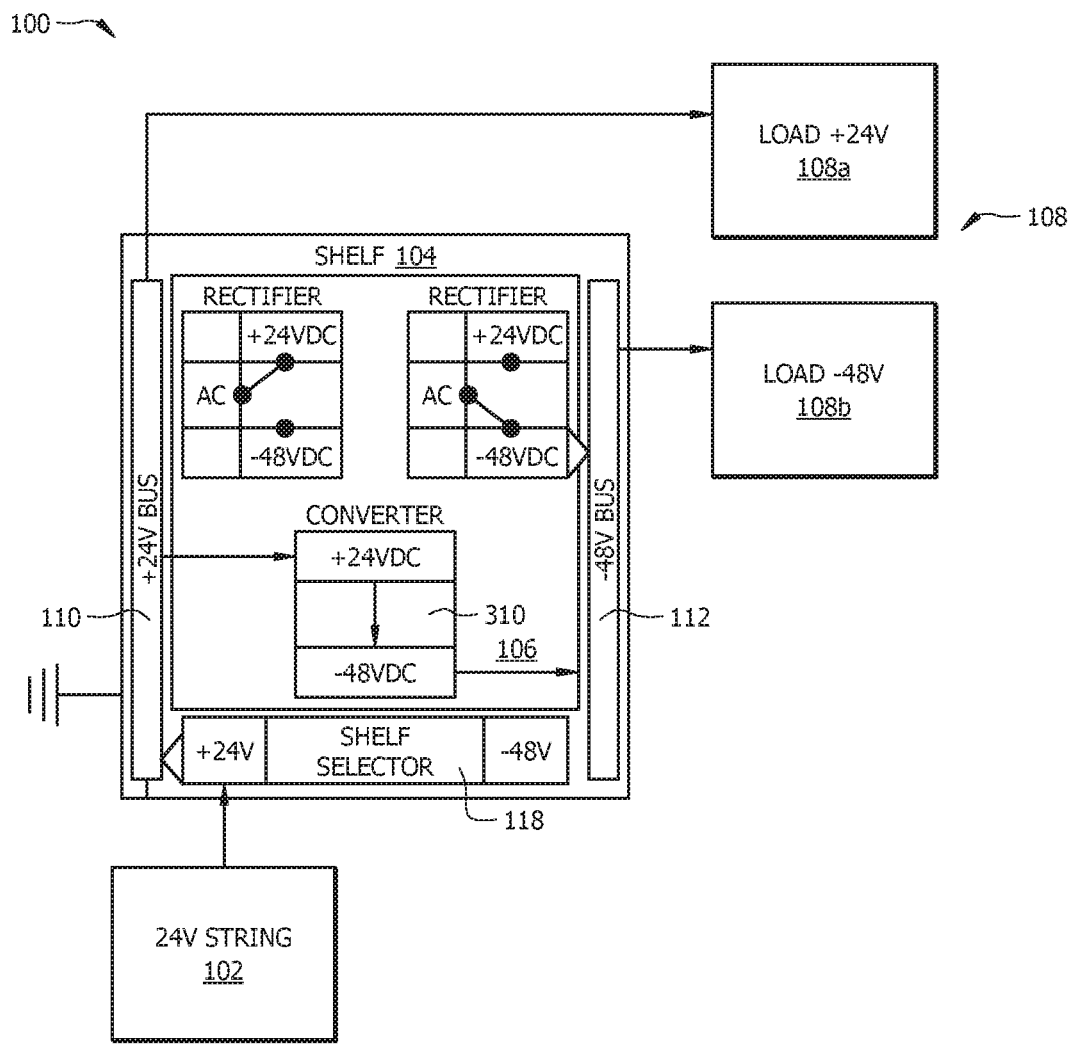
FIG. 10 is a schematic view of another embodiment of a dual voltage power system.

Referring to FIG. 10, an alternative embodiment of a DVPS 100 is illustrated. In such an embodiment, the DVPS 100 does not receive electrical power from the primary power source 101 (not shown). The secondary power source 102 is a +24 VDC battery string and is electrically coupled to the power shelf 104 (e.g., via the switch 118). Additionally, the power shelf 104 is configured such that the switch 118 is configured in first configuration and thereby configured for +24 VDC power operation. The electrical load 108 comprises a +24 VDC electrical load 108a electrically coupled to the +24 VDC trace 110 of the power shelf 104 and a −48 VDC electrical load 108b electrically coupled to the −48 VDC trace 112 of the power shelf 104. In such an embodiment, the +24 VDC electrical load 108a is configured to receive electrical power from the power source 102 (e.g., the +24 VDC battery string) via the power shelf 104 (e.g., via the +24 VDC trace 110). In the embodiment of FIG. 10, the DVPS 100 is configured to provide electrical power to the +24 VDC electrical load and the −48 VDC electrical load via the secondary power source 102. The DVPS 100 is configured to directly provide electrical power from the secondary power source 102 to the +24 VDC electrical load 108a. Additionally, the DVPS 100 comprises a universal rectifier 106 configured to convert the +24 VDC from the secondary power source 102 to provide −48 VDC to the −48 VDC electrical load 108b.

Figure 11:
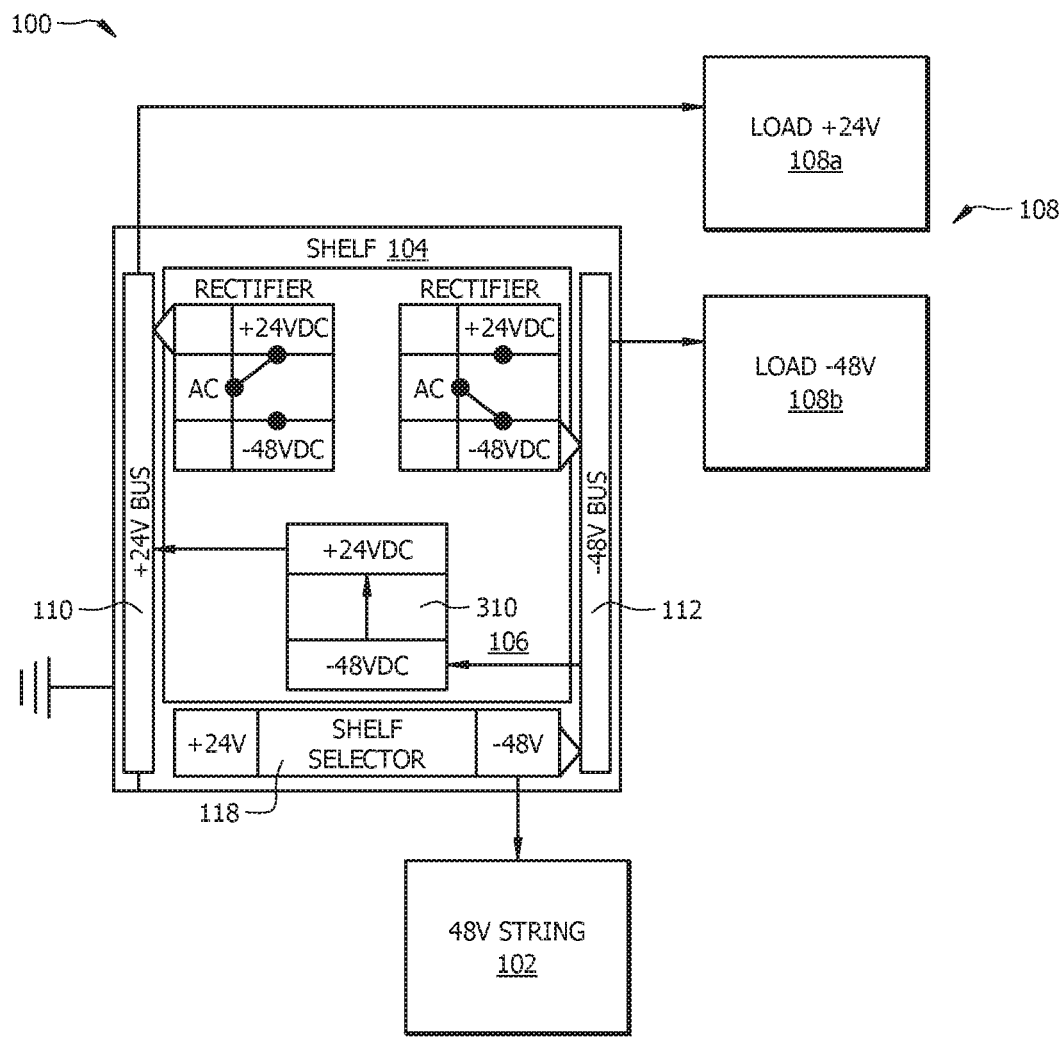
FIG. 11 is a schematic view of another embodiment of a dual voltage power system.

Referring to FIG. 11, an alternative embodiment of a DVPS 100 is illustrated. In such an embodiment, the DVPS 100 is electrically coupled to and receives power from the primary power source 101 (not shown) via the universal rectifier 106. The secondary power source 102 is a −48 VDC battery string and is electrically coupled to the power shelf 104 (e.g., via the switch 118 or directly to the bus traces). Additionally, the power shelf 104 is configured such that the switch 118 is configured in third configuration and thereby configured for −48 VDC power operation. The electrical load 108 comprises a +24 VDC electrical load 108a electrically coupled to the +24 VDC trace 110 of the power shelf 104 and a −48 VDC electrical load 108b electrically coupled to the −48 VDC trace 112 of the power shelf 104. In the embodiment of FIG. 11, the DVPS 100 is configured to provide electrical power to the electrical loads the +24 VDC electrical load 108a and the −48 VDC electrical loads 108b via the universal rectifier 106 (e.g., via the first DC converter 304 and the second DC converter 306). Additionally, while power is available from the primary power source 101 (not shown) is present, the universal rectifier 106 is configured to provide electrical power to the secondary power source 102, for example, to charge or recharge the secondary power source 102.

Figure 12:
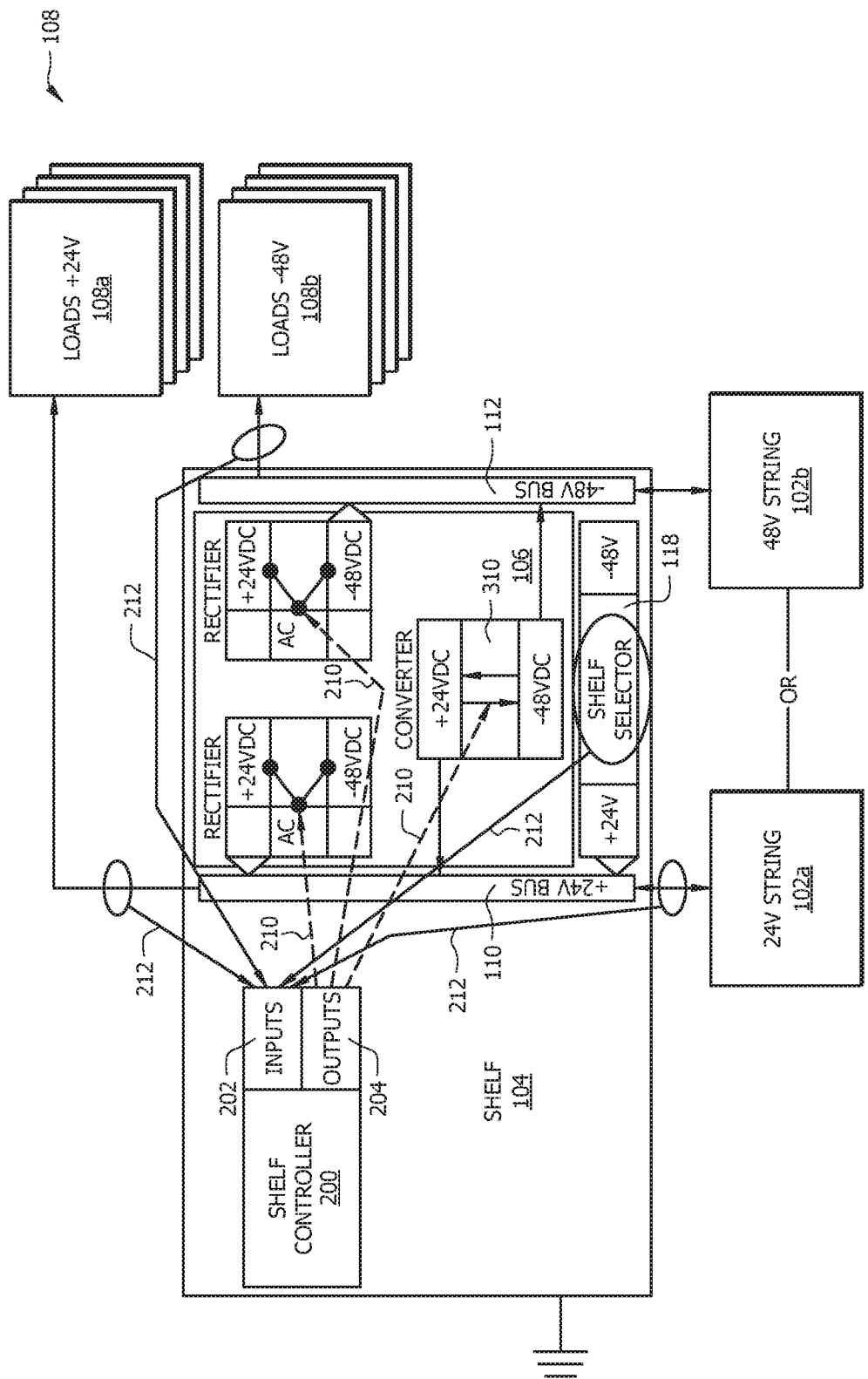
FIG. 12 is a schematic view of another embodiment of a dual voltage power system.

Referring to FIG. 12, in an additional embodiment the DVPS 100 further comprises a shelf controller 200 having a processor in electrical signal communication with one or more input terminals 202 and one or more output terminals 204. In an embodiment, the processor, which may be referred to as a central processing unit (CPU), may be configured to control one or more functional units of the shelf controller 200 and/or to control data flow through the shelf controller 200. For example, the processor may be configured to communicate one or more electrical signals (e.g., control signals, feedback signals, etc.) with one or more portions of the shelf controller 200 (e.g., one or more universal rectifiers 106) and/or to perform one or more processes on the electrical signals (e.g., feedback signals). In such an embodiment, one or more of the processes may be performed in software, hardware, or a combination of software and hardware. The processor may be implemented as one or more CPU chips, cores (e.g., a multi-core processor), digital signal processors (DSPs), and/or application specific integrated circuits (ASICs), and/or any other suitable type and/or configuration as would be appreciated by one of ordinary skill in the arts upon viewing this disclosure.

In an embodiment, the shelf controller 200 is configured to electronically control (e.g., via software) one or more components of the power shelf 104, for example, one or more universal rectifiers 106 in response to one or more feedback signals 212, as will be disclosed herein. In the embodiment of FIG. 12, the shelf controller 200 is configured to electronically actuate (e.g., switch) and/or control one or more of the electronic switches of the universal rectifiers 106 (e.g., the first electronic switch 302, the second electronic switch 312, and/or the third electronic switch 312, as shown in FIGS. 5-8), for example, via one or more control signals 210. The shelf controller 200 may be configured to transmit the one or more control signals 210 via the output terminals 204. Additionally, the shelf controller 200 is configured to receive one or more feedback signals 212, for example, via the input terminals 202. For example, the feedback signals 212 may comprise measured or sensed data (e.g., power consumption, current draw, voltage levels, etc.) about one or more components of the power shelf 104 (e.g., the electrical loads 108, the universal rectifier 106, the primary power source 101, the secondary power source 102, etc.).

In an embodiment, the shelf controller 200 may be configured to select a power operation mode (e.g., +24 VDC power operation, −48 VDC power operation) of one or more universal rectifiers 106, to balance power or voltage levels, to manage redundant or fail-safe components (e.g., backup universal rectifiers 106), to manage the secondary power source 102 (e.g., battery string charging), to monitor and/or alarm power level thresholds (e.g., if more universal rectifiers 106 are needed), to cycle and/or test one or more universal rectifiers 106, any other suitable performance operation as would be appreciated by one of ordinary skill in the at upon viewing this disclosure, or combinations thereof. For example, the shelf controller 200 may be configured to balance a DVPS 100. The shelf controller 200 may be configured to monitor the current draw be supplied to the electrical loads 108. For example, the shelf controller 200 may be configured to determine the amount of available current (e.g., via monitoring a load current) to be supplied by universal rectifiers 106 configured for +24 VDC power operation and by universal rectifiers 106 configured for −48 VDC power operation. In such an example, the shelf controller 200 may also be configured to detect an imbalance between the amount available current for each electrical load type (e.g., +24 VDC electrical loads and −48 VDC electrical loads). For example, an imbalance may be detected when the difference of available current for each electrical load type (e.g., a differential load current) exceeds a differential threshold. Additionally, the shelf controller 200 may be configured to transmit one or more electrical signals (e.g., control signals) to actuate one or more electronic switches, for example, to switch a universal rectifier 106 from a first power operation mode to a second power operation mode or to activate (e.g., turn on) one or more universal rectifiers 106 and thereby balance the DVPS 100. In an embodiment, the shelf controller 200 may be configured to balance the DVPS 100 autonomously. Alternatively, the shelf controller 200 may be configured to balance the DVPS 100 upon receiving user input, for example, the user presses a button.

Figure 13:
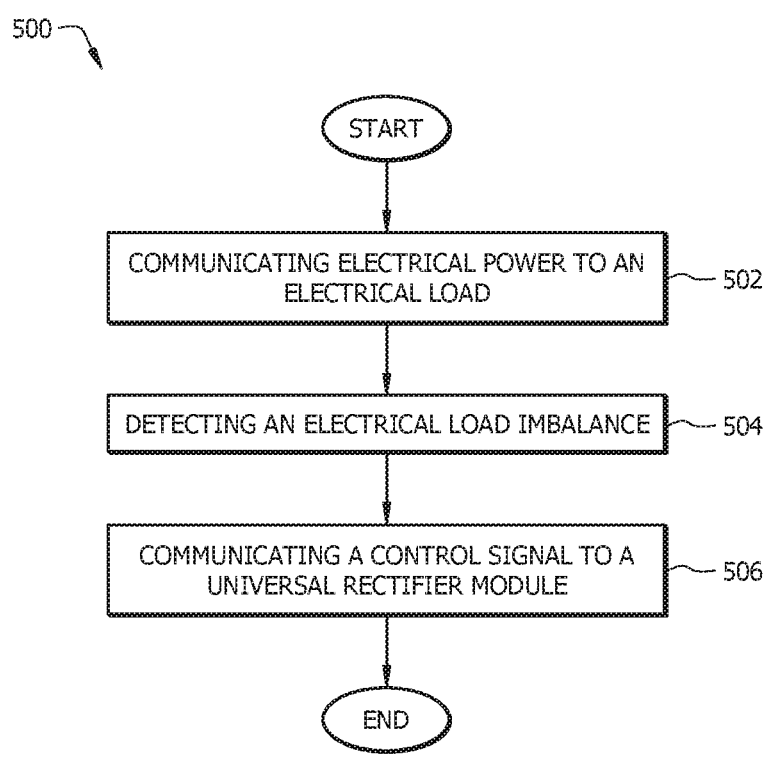
FIG. 13 is a flow chart of an embodiment of a power transmission method.

FIG. 13 is an embodiment of a power transmission method 500 utilizing a power shelf and/or a system comprising a power shelf, such as power shelf 104. In block 502, a power shelf comprising a plurality of universal rectifiers may communicate electrical power to an electrical load. For example, a power shelf (e.g., the power shelf 104) may be provided to a site (e.g., a networking site, a wireless telecommunications site, a data center, a central office, etc.) to be configured to distribute and provide electrical power to one or more electrical systems and/or devices (e.g., one or more electrical loads 108). For example, the power shelf 104 may installed at a central office to provide power to +24 VDC electrical loads and/or −48 VDC electrical loads. The power shelf 104 may be configured by an operator (e.g., a technician) to electrically couple with a power source (e.g., the primary power source 101 and the secondary power source 102) to an electrical load 108 (e.g., a +24 VDC electrical load and/or a −48 VDC electrical load) and to provide the desired electrical voltage (e.g., +24 VDC, −48 VDC, etc.) to the electrical load 108. In an embodiment, one or more secondary power sources 102 may be provided and electrically coupled to the power shelf 104. For example, one or more +24 VDC battery strings are each electrically coupled to the switch 118 (e.g., via the first switch portion 118 or the second switch portion 118b) of the power shelf 104. The switch 118 of the power shelf 104 may be positioned to the first configuration or the third configuration to provide the desired mode of power operation. For example, when the secondary power source 102 is dual +24 VDC battery strings, the switch 118 may be positioned to the first configuration to enable +24 VDC power operation. Alternatively, the switch 118 may be positioned to the third configuration to provide −48 VDC power operation. In an alternative embodiment, when the secondary power source 102 is a +48 VDC battery string, the secondary power source 102 may be directly coupled to the bus traces of the power shelf 104 and/or the switch 118 may be positioned to the third configuration to provide −48 VDC power operation. Additionally, one or more universal rectifiers 106 are installed onto the power shelf 104 (e.g., via a universal rectifier interface 116). Each of the universal rectifiers 106 may be configured to provide a desired mode of operation. For example, a universal rectifier 106 may be configured for +24 VDC power operation. Alternatively, a universal rectifier 106 may be configured for −48 VDC power operation. Additionally, the primary power source 101 may be electrically coupled to the power shelf 104, for example, via the universal rectifiers 106. Further, the power shelf 104 may be electrically coupled to an electrical load 108. For example, the power shelf 104 may electrically couple to the electrical load 108 to the bus traces (e.g., the +24 VDC trace 110, the −48 VDC trace 112, and/or the RTN trace 114) corresponding to the desired voltage level. Additionally, where a shelf controller 200 is present, the shelf controller 200 may be electrically coupled to one or more of the universal rectifiers 106.

Electrical power may be communicated from the power source e.g., the primary power source 101 and/or the secondary power source 102) to the electrical loads 108. While the primary power source 101 is available (e.g., during normal operation), electrical power is communicated from the primary power source 101 to the electrical loads 108 via the universal rectifier 106. For example, an AC voltage signal may be communicated from the primary power source 101 to the universal rectifier 106 to be converted (e.g., rectified) to a suitable DC voltage signal (e.g., +24 VDC and/or +48 VDC) to provide electrical power to the electrical loads 108. As such, the power shelf 104 may communicate the electrical power provided by the primary power source 101 to the electrical loads 108 via the bus traces (e.g., the +24 VDC trace 110, the −48 VDC trace 112, and/or the RTN trace 114) and/or electrical contacts. Additionally, electrical power may also be communicated to the secondary power source 102 via the bus traces (e.g., the +24 VDC trace 110, the −48 VDC trace 112, and/or the RTN trace 114), for example, to charge or recharge the secondary power source 102.

When the primary power source 101 is unavailable (e.g., during a power outage), electrical power is communicated from the secondary power source 102 to the electrical loads 108 via the universal rectifier 106 and/or the bus traces (e.g., the +24 VDC trace 110, the −48 VDC trace 112, and/or the RTN trace 114). For example, a DC voltage signal (e.g., +24 VDC or −48 VDC) may be communicated from the secondary power source 102 to the universal rectifier 106 to be converted (e.g., inverted and rectified) to a suitable DC voltage signal (e.g., +24 VDC and/or −48 VDC) to provide electrical power to the electrical loads 108. As such, the power shelf 104 may communicate the electrical power provided by the secondary power source 102 to the electrical loads 108 via the bus traces (e.g., the +24 VDC trace 110, the −48 VDC trace 112, and/or the RTN trace 114) and/or electrical contacts. Additionally, electrical power may also be communicated from the secondary power source 102 directly to an electrical load 108 via the bus traces (e.g., the +24 VDC trace 110, the −48 VDC trace 112, and/or the RTN trace 114), for example, if no voltage conversion is required.

In block 504, the power shelf 104 may detect an electrical load imbalance. For example, where the power shelf 104 comprises a shelf controller 200, the shelf controller 200 may monitor one or more operating conditions and/or control one or more universal rectifiers 106. The shelf controller 200 may monitor power consumption, current draw, available current, voltage levels, any other suitable operational condition as would be appreciated by one of ordinary skill in the art upon viewing this disclosure, or combinations thereof. For example, the shelf controller 200 may measure and compare the available capacity for each power source type (e.g., a +24 VDC source and a −48 VDC source) and the load for each electrical load type (e.g., a +24 VDC load and a −48 VDC load) to detect an electrical load imbalance. For example, the shelf controller 200 may compare the load for a first electrical load type (e.g., a +24 VDC load) to a capacity threshold for a first power source type (e.g., a +24 VDC source). Additionally, the shelf controller 200 may compare the load for a second electrical load type (e.g., +48 VDC load) to a capacity threshold for a second power source type (e.g., a +48 VDC source).

In block 506, in response to detecting an electrical load imbalance, a control signal may be communicated to one or more universal rectifiers to balance an electrical load. For example, the shelf controller 200 may communicate one or more electrical signals (e.g., control signals) to select a power operation mode (e.g., +24 VDC power operation, −48 VDC power operation) of one or more universal rectifiers 106 to balance power or voltage levels of the power shelf 104. For example, one or more universal rectifiers 106 may transition to/from the off state to the +24 VDC operation mode or the −48 VDC operation mode. Additionally or alternatively, the shelf controller 200 may communicate one or more control signals to manage or activate fail-safe components (e.g., backup universal rectifiers 106), to manage the charging of the secondary power source 102 (e.g., battery string charging), to trigger an alarm (e.g., if current and/or electrical power exceeds a threshold), to cycle and/or test one or more universal rectifiers 106, any other suitable performance operation as would be appreciated by one of ordinary skill in the art upon viewing this disclosure, or combinations thereof. In an embodiment, if the load for the first electrical load type (e.g., +24 VDC load) exceeds the capacity threshold for the first power source type (e.g., +24 VDC source), the shelf controller 200 may communicate an electrical signal to transition the power operation mode of one or more universal rectifiers 106 (e.g., from −48 VDC power operation to +24 VDC power operation). Alternatively, if the load for the second electrical load type (e.g., −48 VDC load) also exceeds the capacity threshold for the second power source type (e.g., −48 VDC source), the shelf controller 200 may trigger an alarm (e.g., a visible and/or audible indicator). Further, the shelf controller 200 may continue to monitor the power shelf 104 for electrical load imbalances, for example, as previously disclosed with respect to block 504.

In an embodiment, a DVPS 100, a system comprising such a DVPS 100, and/or a power transmission method employing such a DVPS 100, as disclosed herein or in some portion thereof, may be advantageously employed to accept and utilize a variety of secondary power source voltage types to provide electrical power to one or more electrical loads 108. In an embodiment, a DVPS like DVPS 100 enables a power distribution system to utilize both a +24 VDC battery string and +48 VDC battery string from a single system. Conventional systems are configured to utilize a single secondary power source voltage type, for example, only a +24 VDC battery string or a −48 VDC battery string but not both. Additionally, the DVPS 100 enables an operator to selectively provide both +24 VDC power operation and −48 VDC power operation from a pair of +24 VDC battery strings, for example, via positioning the switch 118 to select the appropriate power shelf configuration to provide the desired power operation mode. Conventional systems may require a power system be replaced and/or rewired to utilize a different power operation mode. Further, conventional systems may require installing duplicate components in order to provide dual modes of power operation. The DVPS 100 is able to provide dual modes of power operation from a single system and eliminates the need for duplicate components and/or increasing the system footprint to house additional components and thereby may provide improved space efficiency and/or reduced costs when providing dual power operation modes. Further still, the DVPS 100 provides a unified dual power operation system which enables the ability to employ a controller (e.g., a shelf controller 200) to monitor and/or control dual power transmission to the electrical loads. Conventional systems are unable to provide such a unified dual power operation system and as such are also unable to employ a controller to manage multiple modes of power operation simultaneously.

Additionally, the DVPS 100 provides a single unified system to provide both DC/AC conversions and high efficiency AC/DC conversions by employing a single stage conversion from AC voltage to both +24 VDC and −48 VDC. Further, the DVPS 100 provide bidirectional power transmission to both employ the secondary power source (e.g., to source electrical power from the secondary power source) and to charge/recharge the secondary power source (e.g., to sink electrical power to the secondary power supply). Therefore, the apparatus, systems, and methods disclosed herein provide a means by which multiple secondary power source voltage types may be utilized to provide electrical power to one or more electrical loads.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a first direct current (DC) converter, wherein an output of the first DC converter is coupled to a first terminal;
    a second DC converter, wherein an output of the second DC converter is coupled to a second terminal;
    a first electronic switch coupled to an input of the first DC converter and an input of the second DC converter, wherein the first electronic switch is configured to selectively route an alternating current (AC) voltage signal to the first DC converter or to the second DC converter;
    a third DC converter configured to operate in the event that the first electronic switch does not receive the AC voltage signal to:
        receive a first direct current (DC) voltage signal; and
        convert the first DC voltage signal to a second DC voltage signal;
    a second electronic switch coupled to the first terminal, the second terminal, and an input of the third DC converter, wherein the second electronic switch is configured to selectively route the output of the first DC converter or the output of the second DC converter to the third DC converter; and
    a third electronic switch coupled to the input of the first DC converter, the input of the second DC converter, and an output of the third DC converter, wherein the third electronic switch is configured to selectively route the second DC voltage signal to the first DC converter or to the second DC converter.

2. The apparatus of claim 1, wherein an input of the first electronic switch is coupled to a power factor correction (PFC) circuit in series with a capacitor.

3. The apparatus of claim 1, wherein the first DC converter is configured to convert the second DC voltage signal to a third DC voltage signal.

4. The apparatus of claim 3, wherein the second DC converter is configured to convert the second DC voltage signal to a fourth DC voltage signal.

5. The apparatus of claim 4, wherein the apparatus is configured to:
    receive the first DC voltage signal from the first terminal;
    communicate the first DC voltage signal to the third DC converter via the second electronic switch and thereby generate the second DC voltage signal;
    communicate the second DC voltage signal to the second DC converter via the third electronic switch and thereby generate the fourth DC voltage signal; and
    output the fourth DC signal to the second terminal.

6. The apparatus of claim 5, wherein the first DC voltage signal is a +24 volt DC signal and the second DC voltage signal is a −48 volt DC signal.

7. The apparatus of claim 4, wherein the apparatus is configured to:
    receive the first DC voltage signal from the second terminal;
    communicate the first DC voltage signal to the third DC converter via the second electronic switch and thereby generate the second DC voltage signal;
    communicate the second DC voltage signal to the first DC converter via the third electronic switch and thereby generate the third DC voltage signal; and
    output the third DC voltage signal to the first terminal.

8. An apparatus comprising:
    a first bus trace coupled with a first universal rectifier;
    a second bus trace coupled with a second universal rectifier;
    a third bus trace coupled with a third universal rectifier; and
    a switch configured to selectively provide a first direct current (DC) voltage between the first bus trace and the third bus trace and a second DC voltage between the second bus trace and the third bus trace, wherein the switch comprises:
        a first switch portion configured to couple to a first DC voltage source; and
        a second switch portion configured to couple to a second DC voltage source,
        wherein when the switch portions are positioned in a first configuration, the switch portions are configured to provide the first DC voltage,
        wherein when the switch portions are positioned in a second configuration, the switch portions are configured to not provide the first DC voltage or the second DC voltage, and
        wherein when the switch portions are positioned in a third configuration, the switch portions are configured to provide the second DC voltage.

9. The apparatus of claim 8, wherein the first DC source is a +24 volt source and the second DC source is a +24 volt source, wherein when the switch portions are in the first configuration, the switch portions are configured to provide +24 volts DC, and wherein when the switch portions are in the third configuration, the switch portions are configured to provide −48 volts DC.

10. The apparatus of claim 8, wherein the apparatus further comprises a third DC source coupled to the second bus trace and the third bus trace.

11. The apparatus of claim 8, wherein in the first configuration the switch portions are connected in parallel and wherein in the third configuration the switch portions are connected in series.

12. A universal rectifier comprising:
a first direct current (DC) power converter, a second DC power converter, and a third DC power converter, each DC power converter comprising an input and an output;
a first switch and a second switch, each switch comprising one input terminal and two output terminals, and a third switch comprising two input terminals and one output terminal; and
a first bus and a second bus, wherein the first bus is electrically coupled to a first load at a first voltage and wherein the second bus is electrically coupled to a second load at a second voltage,
wherein the output of the first DC power converter is electrically coupled to the first bus and to the first input terminal of the third switch,
wherein the output of the second DC power converter is electrically coupled to the second bus and to the second input terminal of the third switch, and
wherein the first output terminal of the first switch is electrically coupled to the input of the first DC power converter and the second output terminal of the first switch is electrically coupled to the input of the second DC power converter.

13. The universal rectifier of claim 12, wherein the input terminal of the first switch is electrically coupled to an alternating current (AC) power source, wherein the first switch is selectively actuated such that the input terminal of the first switch is electrically coupled to the first output terminal of the first switch, wherein the third switch is selectively actuated such that the first input terminal of the third switch is not electrically coupled to the output terminal of the third switch, and wherein the universal rectifier provides the first voltage to the first bus.

14. The universal rectifier of claim 12, wherein the input terminal of the first switch is electrically coupled to an alternating current (AC) power source, wherein the first switch is selectively actuated such that the input terminal of the first switch is electrically coupled to the second output terminal of the first switch, wherein the third switch is selectively actuated such that the second input terminal of the third switch is not electrically coupled to the output terminal of the third switch, and wherein the universal rectifier provides the second voltage to the second bus.

15. The universal rectifier of claim 12, wherein the second bus is electrically coupled to a secondary DC power source at a second voltage, wherein the third switch is selectively actuated such that the second input terminal of the third switch is electrically coupled to the output terminal of the third switch, wherein the second switch is selectively actuated such that the input terminal of the second switch is electrically coupled to the first output terminal of the second switch, and wherein the universal rectifier provides the first voltage to the first bus.

16. The universal rectifier of claim 12, wherein the first bus is electrically coupled to a secondary DC power source at a first voltage, wherein the third switch is selectively actuated such that the first input terminal of the third switch is electrically coupled to the output terminal of the third switch, wherein the second switch is selectively actuated such that the input terminal of the second switch is electrically coupled to the second output terminal of the second switch, and wherein the universal rectifier provides the first voltage to the first bus.

17. The universal rectifier of claim 12, wherein the input terminal of the first switch is electrically coupled to a power factor correction circuit in series with a capacitor.

18. The universal rectifier of claim 12, wherein the first voltage is +24 volts DC and the second voltage is −48 volts DC.

19. The universal rectifier of claim 12, further comprising a power shelf controller, wherein the power shelf controller is electrically coupled to the first switch, second switch, and third switch, and wherein the power shelf controller selectively actuated the first switch, second switch, and third switch.

* * * * *